(12) United States Patent
Bergsma et al.

(10) Patent No.: US 7,153,124 B2
(45) Date of Patent: Dec. 26, 2006

(54) PREFORMING THERMOPLASTIC DUCTS

(75) Inventors: Bryan K. Bergsma, Spokane, WA (US); Joseph P. Canavan, Spokane, WA (US); Thomas J. Courrier, Coeur D'Alene, ID (US); Walter Forrest Frantz, North Bend, WA (US); Harvey T. Jones, Spokane, WA (US); Denis J. Klein, Spokane, WA (US); Matthew K. Lum, Mercer Island, WA (US); Mark L. Younie, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 504 days.

(21) Appl. No.: 10/215,815

(22) Filed: Aug. 9, 2002

(65) Prior Publication Data

US 2004/0026825 A1 Feb. 12, 2004

(51) Int. Cl.
B29C 51/02 (2006.01)
B29C 57/10 (2006.01)

(52) U.S. Cl. .................. 425/384; 425/395; 425/409; 425/423

(58) Field of Classification Search ................ 425/394, 425/395, 384, 407, 408–409, 423; 156/218
See application file for complete search history.

(56) References Cited

U.S. PATENT DOCUMENTS

| 2,941,570 | A | * | 6/1960 | Plym ......................... 156/156 |
| 3,388,017 | A | | 6/1968 | Grimsley et al. |
| 3,499,072 | A | | 3/1970 | Helling et al. |
| 3,899,277 | A | | 8/1975 | Winter |
| 3,952,676 | A | | 4/1976 | Rockefeller |
| 3,984,906 | A | * | 10/1976 | Schlosser et al. ........... 156/392 |
| 4,068,622 | A | | 1/1978 | Vola |
| 4,084,306 | A | * | 4/1978 | Barker ........................ 156/215 |
| 4,468,557 | A | * | 8/1984 | Bylin et al. .................. 219/535 |
| 4,559,765 | A | | 12/1985 | Cress et al. |
| 4,911,633 | A | * | 3/1990 | Comfort ..................... 425/396 |
| 5,225,016 | A | | 7/1993 | Sarh |
| 5,435,804 | A | * | 7/1995 | Konzal ........................ 156/218 |
| 5,456,591 | A | * | 10/1995 | Lo .............................. 425/374 |
| 5,505,813 | A | | 4/1996 | Scheifele et al. |
| 5,635,014 | A | | 6/1997 | Taylor |
| 5,851,619 | A | | 12/1998 | Sakai et al. |

(Continued)

FOREIGN PATENT DOCUMENTS

EP 0 141 604 A 5/1985

(Continued)

OTHER PUBLICATIONS

CETEX® Application in Ducting; Ten Cate Advanced Composites Technical Document Nr ITD5235.017; Oct. 1990; pp. 1-10; Nijverdal, The Netherlands.

(Continued)

*Primary Examiner*—Yogendra N. Gupta
*Assistant Examiner*—Thu Khanh T. Nguyen
(74) *Attorney, Agent, or Firm*—Alston & Bird LLP

(57) ABSTRACT

There are provided apparatuses and related methods for preforming sheets to form preforms for forming ducts. The preforms can be formed of a thermoplastic material, such as flat sheets of reinforced thermoplastic, which can be lightweight, strong, and perform well in flammability, smoke, and toxicity tests. The apparatus includes a heater for heating the sheet to a processing temperature and a structure for configuring the sheet to a desired shape of the duct. For example, rollers, rods, tubes, or a funnel can be used to bend the sheet.

8 Claims, 12 Drawing Sheets

U.S. PATENT DOCUMENTS 6,284,089 B1    9/2001    Anderson et al.
2004/0151797 A1*    8/2004    Mue et al. ............... 425/450.1

FOREIGN PATENT DOCUMENTS

JP            59 078826 A     8/1984

OTHER PUBLICATIONS

A short note on Duct Manufacturing for Aircraft Environmental Control Systems using CETEX Continuous fiber reinforced thermoplastic; Ten Cate Advanced Composites Technical Document Nr ITD5241.002; 1992; pp. 1-6; Nijverdal, The Netherlands.

* cited by examiner

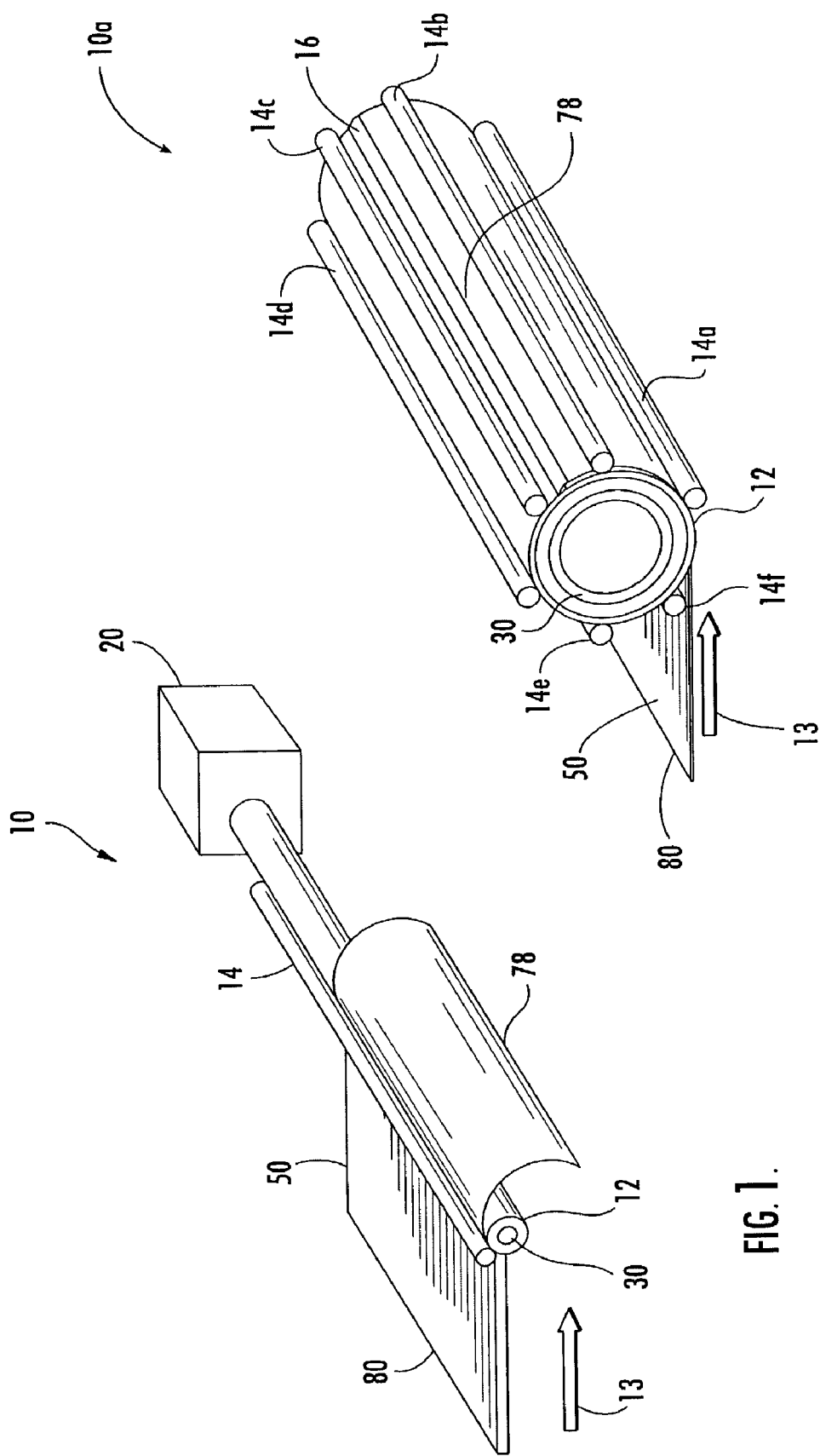

PREFORMING THERMOPLASTIC DUCTS

BACKGROUND OF THE INVENTION

1) Field of the Invention

The present invention relates to apparatuses and methods for preforming thermoplastic materials and, more specifically, to apparatuses and methods for bending thermoplastic sheets to form preforms for ducts.

2) Description of Related Art

Ducts provide transport passageways for a wide variety of applications. For example, tubular ducts are widely used for air flow in aircraft environmental control systems. Similarly, ducts provide passageways for transporting gases for heating and ventilation in other vehicles and in buildings. Water distribution systems, hydraulic systems, and other fluid networks also often use ducts for fluid transport. In addition, solid materials, for example, in particulate form can be delivered through ducts. Ducts for the foregoing and other applications can be formed of metals, plastics, ceramics, composites, and other materials.

One conventional aircraft environmental control system utilizes a network of ducts to provide air for heating, cooling, ventilation, filtering, humidity control, and/or pressure control of the cabin. In this conventional system, the ducts are formed of a composite material that includes a thermoset matrix that impregnates, and is reinforced by, a reinforcing material such as Kevlar®, registered trademark of E. I. du Pont de Nemours and Company. The thermoset matrix is typically formed of an epoxy or polyester resin, which hardens when it is subjected to heat and pressure. Ducts formed of this composite material are generally strong and lightweight, as required in many aircraft applications. However, the manufacturing process can be complicated, lengthy, and expensive, especially for ducts that include contours or features such as beads and bells. For example, in one conventional manufacturing process, ducts are formed by forming a disposable plaster mandrel, laying plies of fabric preimpregnated with the thermoset material on the mandrel, and consolidating and curing the plies to form the duct. The tools used to mold the plaster mandrel are specially sized and shaped for creating a duct of specific dimensions, so numerous such tools must be produced and maintained for manufacturing different ducts. The plaster mandrel is formed and destroyed during the manufacture of one duct, requiring time for curing and resulting in plaster that typically must be removed or destroyed as waste. Additionally, the preimpregnated plies change shape during curing and consolidation and, therefore, typically must be trimmed after curing to achieve the desired dimensions. The jigs required for trimming and for locating the proper positions for features such as holes and spuds are also typically used for only a duct of particular dimensions, so numerous jigs are required if different ducts are to be formed. Like the rotatable tools used for forming the mandrels, the jigs require time and expense for manufacture, storage, and maintenance. Additionally, ducts formed of conventional thermoset epoxies typically do not perform well in certain flammability, smoke, and toxicity tests, and the use of such materials can be unacceptable if performance requirements are strict. Further, features such as beads typically must be post-formed, or added after the formation of the duct, requiring additional manufacture time and labor.

Alternatively, ducts can also be formed of thermoplastic materials. A thermoplastic duct can be formed by forming a thermoplastic sheet of material, cutting the sheet to a size and configuration that corresponds to the desired shape of the duct, bending the sheet to the desired configuration of the duct, and joining longitudinal edges of the sheet to form a longitudinal joint or seam. For example, apparatuses and methods for forming thermoplastic ducts and consolidation joining of thermoplastic ducts are provided in U.S. application Ser. Nos. [. . . ] and [. . . ], titled "Thermoplastic Laminate Duct" and "Consolidation Joining of Thermoplastic Laminate Ducts," both of which are filed concurrently herewith and the contents of which are incorporated herein by reference. Such thermoplastic ducts can be formed by retaining the thermoplastic sheet in the bent configuration until the ends are joined, and then releasing the duct so that the resulting joint continues to restrain the duct in the bent configuration. However, stresses induced in the thermoplastic material during bending can cause the duct to deform or distort from the desired configuration after joining, e.g., when released from the joining apparatus.

Thus, there exists a need for improved apparatuses and methods of preforming ducts, i.e., providing a preform configured to correspond generally to the desired configuration of the duct in a substantially unstressed condition. The method should not require the laying of individual plies on a disposable plaster mandrel. Preferably, the method should be compatible with thermoplastic ducts, including reinforced thermoplastic ducts formed from flat sheets, which provide high strength-to-weight ratios and meet strict flammability, smoke, and toxicity standards.

SUMMARY OF THE INVENTION

The present invention provides an apparatus and method for preforming sheets to form preforms for forming ducts. The preforms can be formed from thermoplastic materials, such as flat sheets of reinforced thermoplastic laminate. Thus, individual plies need not be laid on a disposable plaster mandrel. The thermoplastic material can be lightweight, strong, and perform well in flammability, smoke, and toxicity tests. Additionally, the method is compatible with ducts that are formed by consolidation joining thermoplastic laminates. In an unstressed condition, the preforms correspond generally to the desired configuration of the ducts. Thus, longitudinal edges of the preforms can be joined to form the duct, and the duct does not deform when released from the joining apparatus.

According to one embodiment, the present invention provides an apparatus for preforming a thermoplastic member to form a preform that generally corresponds to the desired configuration of the duct, which defines a passage. The apparatus includes first and second rotatable rollers, which are substantially parallel and define a nip, and a heater configured to heat the thermoplastic member to a processing temperature, for example, less than a glass transition temperature of the thermoplastic member and within about 70° F. of the glass transition temperature. In one advantageous embodiment, the processing temperature is between about 5° F. and 70° F. less than the glass transition temperature. At least one of the rollers is heated and at least one of the rollers is configured to rotate and thereby translate the thermoplastic member through the nip so that the thermoplastic member is heated, compressed, and bent generally to the desired configuration of the duct. A rotational actuator can be configured to rotate one of the rollers, and the first roller can be heated by the heater located therein. An actuator can also be configured to adjust at least one of the rollers in a transverse direction to adjust the nip. Additionally, a fastener can be provided to connect a longitudinal leading edge of the thermoplastic member to the first roller. A non-stick layer can be disposed on the rollers to facilitate release of the preform therefrom, and the rollers can be magnetically attracted.

According to one aspect of the invention, the apparatus includes third and fourth rollers, which are also positioned substantially parallel and proximate to the first roller. The second, third, and fourth rollers are positioned at incremental angular positions about the first roller so that each of the second, third, and fourth rollers is capable of urging the thermoplastic member against the first roller in a configuration that generally corresponds to the desired configuration of the duct. According to another aspect, a deflection roller is positioned to intersect a tangent of the nip so that the thermoplastic member is deflected and bent about the first roller. The deflection roller can be offset from the tangent, and an actuator can be configured to adjust an offset position of the deflection roller.

According to another embodiment, the present invention provides another apparatus for preforming a thermoplastic member to form a preform generally corresponding to the desired configuration of the duct. The apparatus includes a support structure extending longitudinally and at least partially defining a cavity. An elongate member with an outer surface corresponding to the desired configuration of the duct extends longitudinally in the cavity so that the thermoplastic member can be supported between the support structure and the elongate member. A heater is configured to heat the thermoplastic member to a processing temperature, for example, within about 70° F. of the glass transition temperature of the thermoplastic member. The support structure is configured to adjust from a first position in which the support structure supports the thermoplastic member in a flat configuration to a second position in which the support structure is adjusted radially inward to bend the thermoplastic member against the elongate member to the desired configuration of the duct. At least one actuator can be configured to adjust the support structure between the first and second positions. The support structure can include a plurality of rods that extend longitudinally in the first position and adjust to an angularly incremental configuration about the elongate member in the second position.

According to another aspect, the support structure includes two partial hollow tubes that are rotatably adjustable between the first and second positions, each tube defining an interior surface corresponding to the outer surface of the elongate member. A heater can heat the interior surfaces of the tubes to the processing temperature. Each tube can define a first longitudinal edge joined by a hinge and a second longitudinal edge defining a radially inwardly extending stop, and the tubes can be configured to rotatably adjust from a first position in which the cavity is open to a second position in which the cavity is at least partially closed. In the first position, the tubes are configured to receive and support the thermoplastic member between the stops. In the second position, the tubes cooperably form the cavity and define an inner surface corresponding to the desired configuration of the duct.

According to another embodiment, the preforming apparatus includes a hollow tube that defines a longitudinal cavity. A funnel extends longitudinally from an end of the tube and tapers in the longitudinal direction toward the tube from a cross-sectional size larger than the duct to a cross-sectional size about equal to the duct. The funnel is configured to receive the thermoplastic member and configure the thermoplastic member to the desired configuration of the duct as the thermoplastic member is urged longitudinally through the funnel. A heater is configured to heat the funnel and/or the tube to a processing temperature, for example, less than the glass transition temperature of the thermoplastic member and within about 70° F. of the glass transition temperature.

The present invention also provides a method for preforming a thermoplastic member to form a preform generally corresponding to a desired configuration of a thermoplastic duct defining a passage. The method includes heating the thermoplastic member to a processing temperature, e.g., between about 5° F. and 70° F. less than a glass transition temperature of the thermoplastic member. A first and/or second roller is rotated, and the thermoplastic member is transported through a nip defined by the rollers so that the member is heated, compressed, and bent generally to the desired configuration of the duct. The rollers can also be magnetically urged together. The thermoplastic member can be heated before being transported through the nip and by the roller(s) as the member is transported through the nip. The thermoplastic member can be transported about the first roller through nips defined between the first and second rollers, the first roller and a third roller, and the first roller and a fourth roller. Additionally, the thermoplastic member can be continuously transported about the first roller an angular distance of more than one revolution, for example, by fastening a longitudinal leading edge of the thermoplastic member to the first roller. A deflection roller can be positioned to intersect a tangent of the nip so that a rotational axis of the deflection roller is offset from the tangent of the nip in the direction of the second roller, and the deflection roller deflects the thermoplastic member to bend about the first roller.

According to another embodiment, the thermoplastic member is heated to the processing temperature, supported with a longitudinally extending support structure in a generally flat configuration, and bent against an outer surface of the elongate member to the desired configuration of the duct as the support structure is adjusted radially inward, for example, by an actuator. The thermoplastic member can be supported by a plurality of rods, which extend longitudinally and adjust to an angularly incremental configuration about the elongate member. Alternatively, the thermoplastic member can be supported by two partial hollow tubes in an open configuration and urged against the elongate member by an interior surface of the tubes corresponding to the outer surface of the elongate member as the tubes adjust to a closed position. According to one aspect of the invention, a first edge of the thermoplastic member is urged against a second edge of the thermoplastic member and the edges are heated to above the glass transition temperature and consolidation joined. For example, the edges can be urged together by adjusting a consolidation joining head radially against the thermoplastic member such that an elastomeric portion of the head urges the edges against the elongate member.

According to another embodiment, the thermoplastic member is heated to the processing temperature, supported between radially inwardly extending stops defined by two partial hollow longitudinal tubes, and bent to the desired configuration of the duct as the tubes are rotatably adjusted about a hinge from an open position to a closed position. According to yet another embodiment, a tapering funnel is provided for preforming the thermoplastic member. The thermoplastic member is heated to the processing temperature, inserted into a first end of the funnel that is larger than the duct and urged through a second, smaller end of the funnel and into a hollow tube.

BRIEF DESCRIPTION OF THE DRAWINGS

Figure 4:
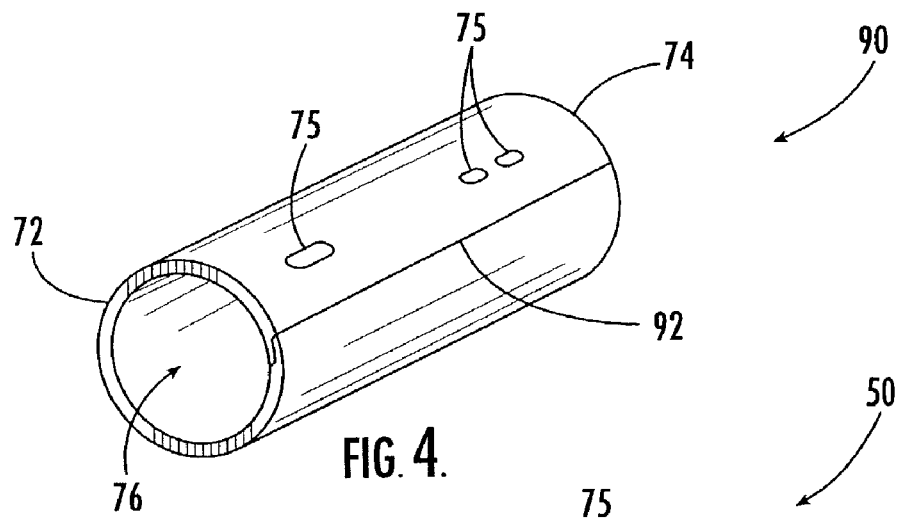
Figure 2:
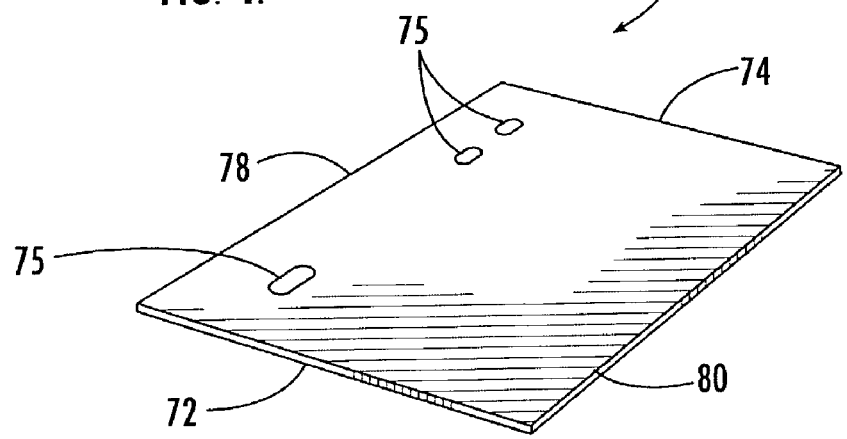
Figure 3:
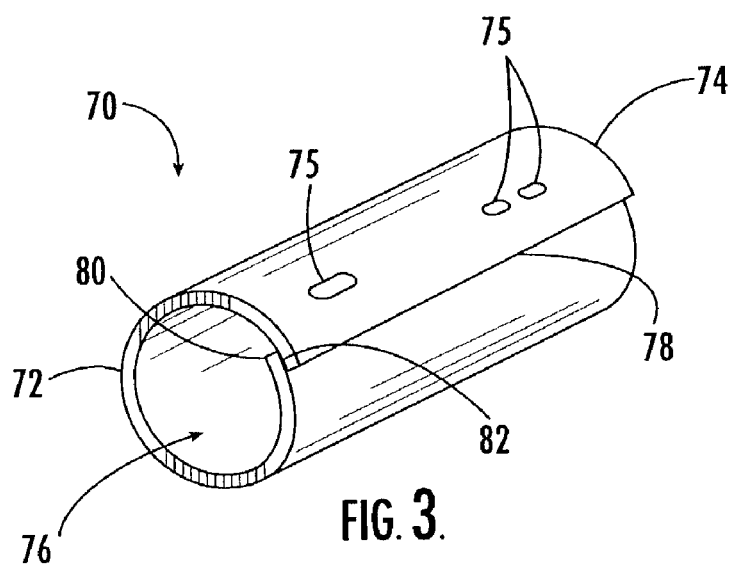
Figure 6:
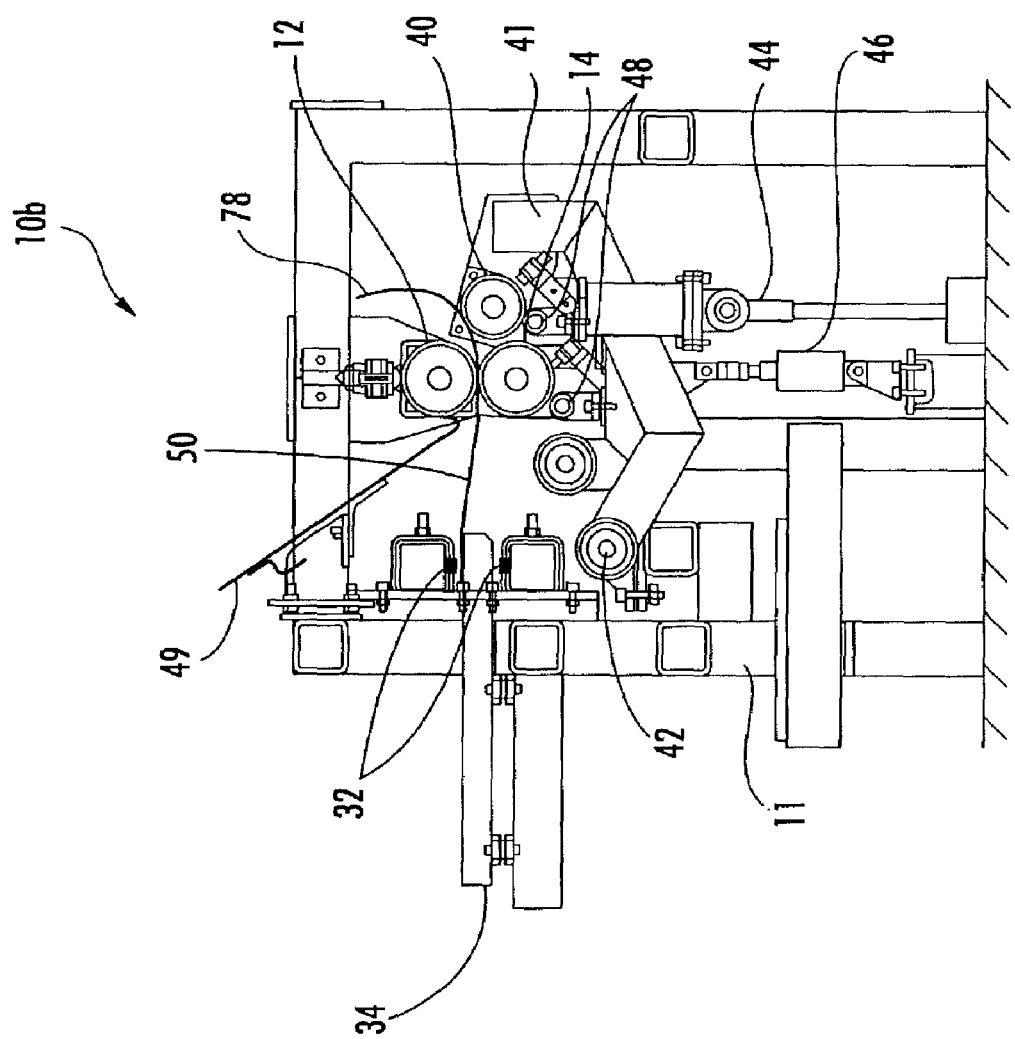
Figure 7:
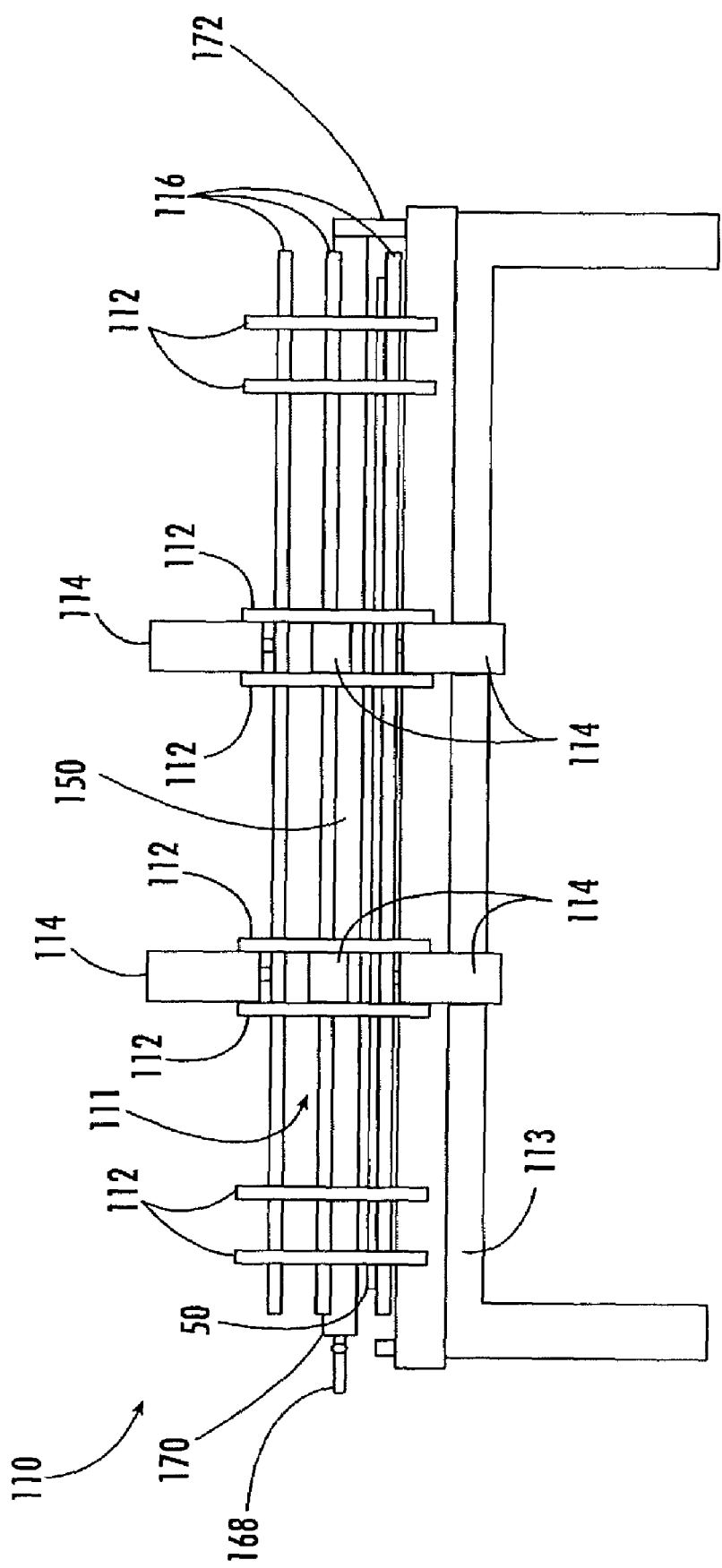
Figure 8:
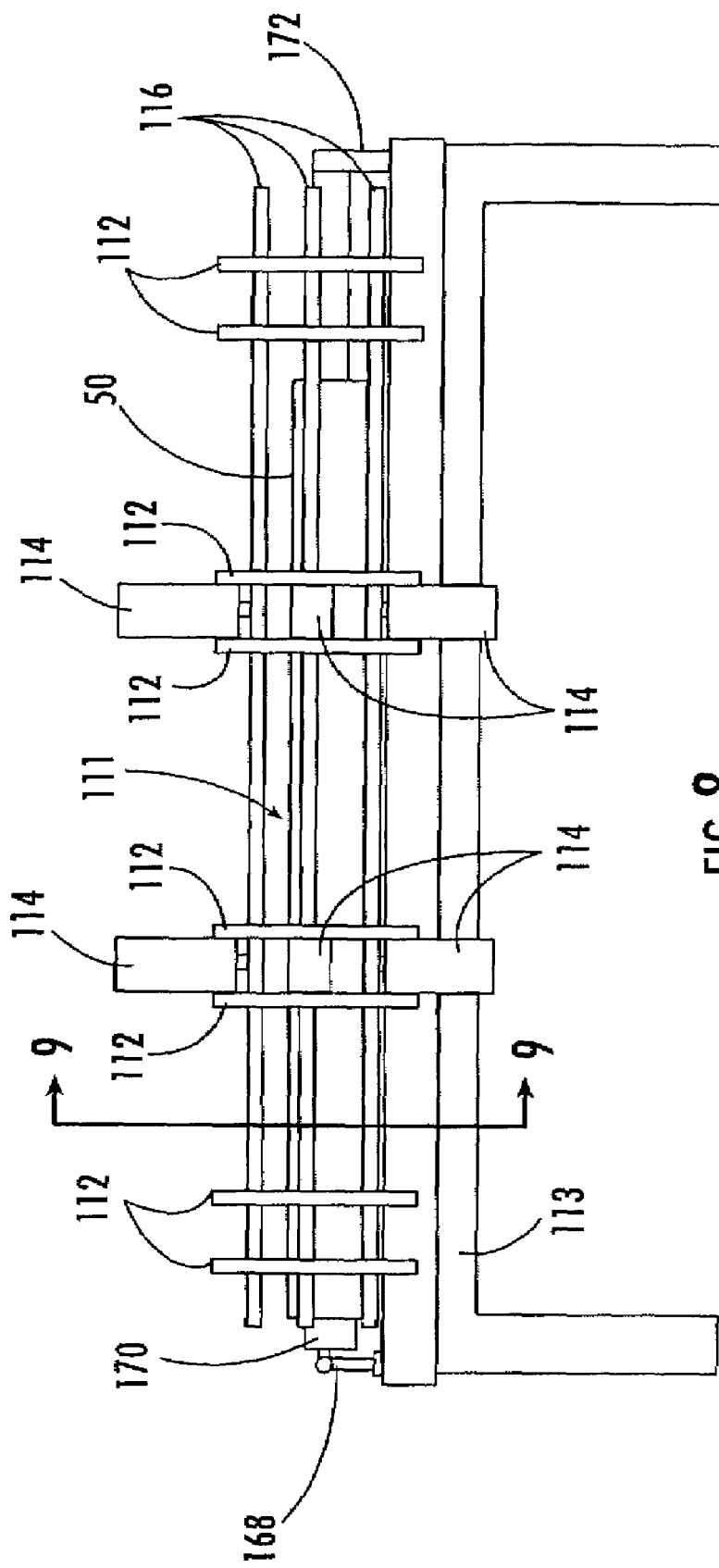
Figure 9:
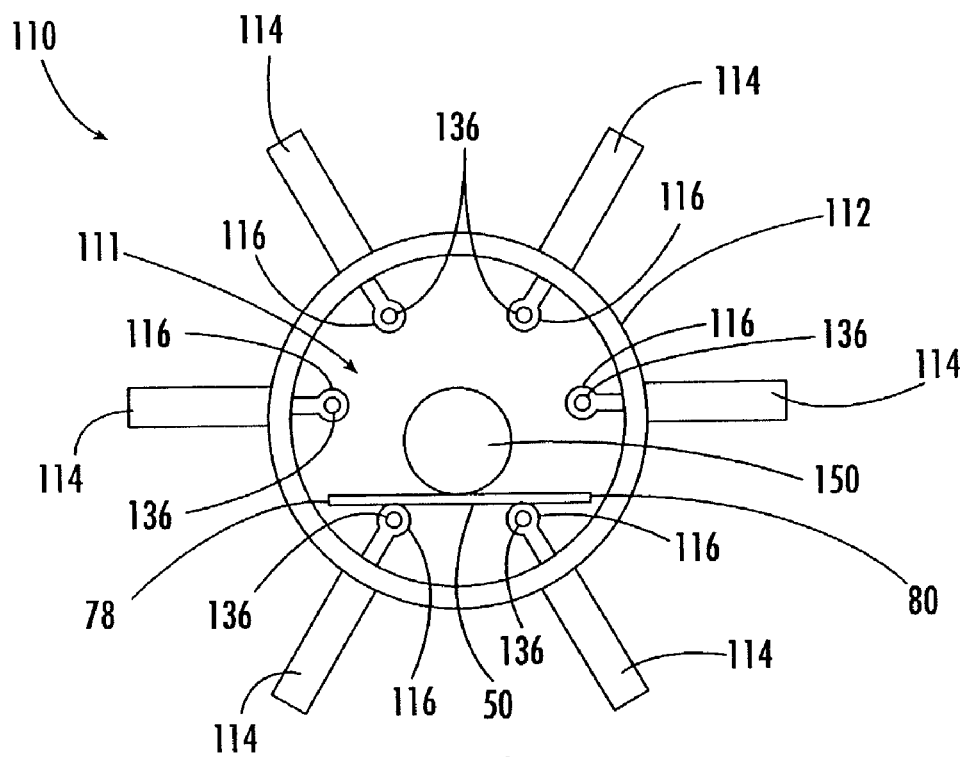
Figure 10:
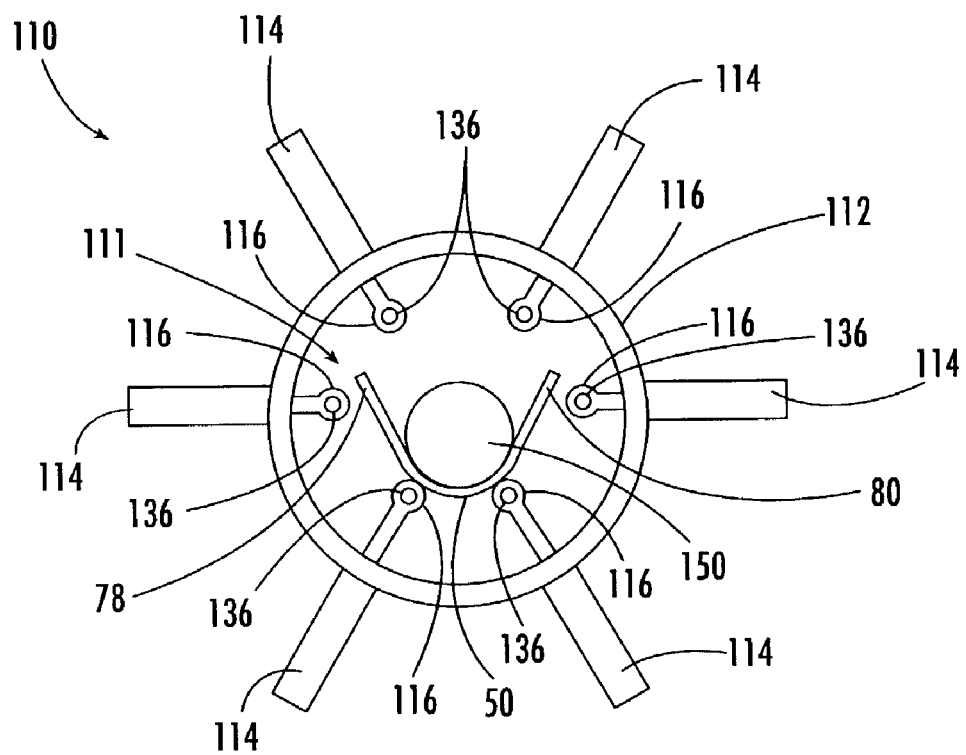
Figure 11:
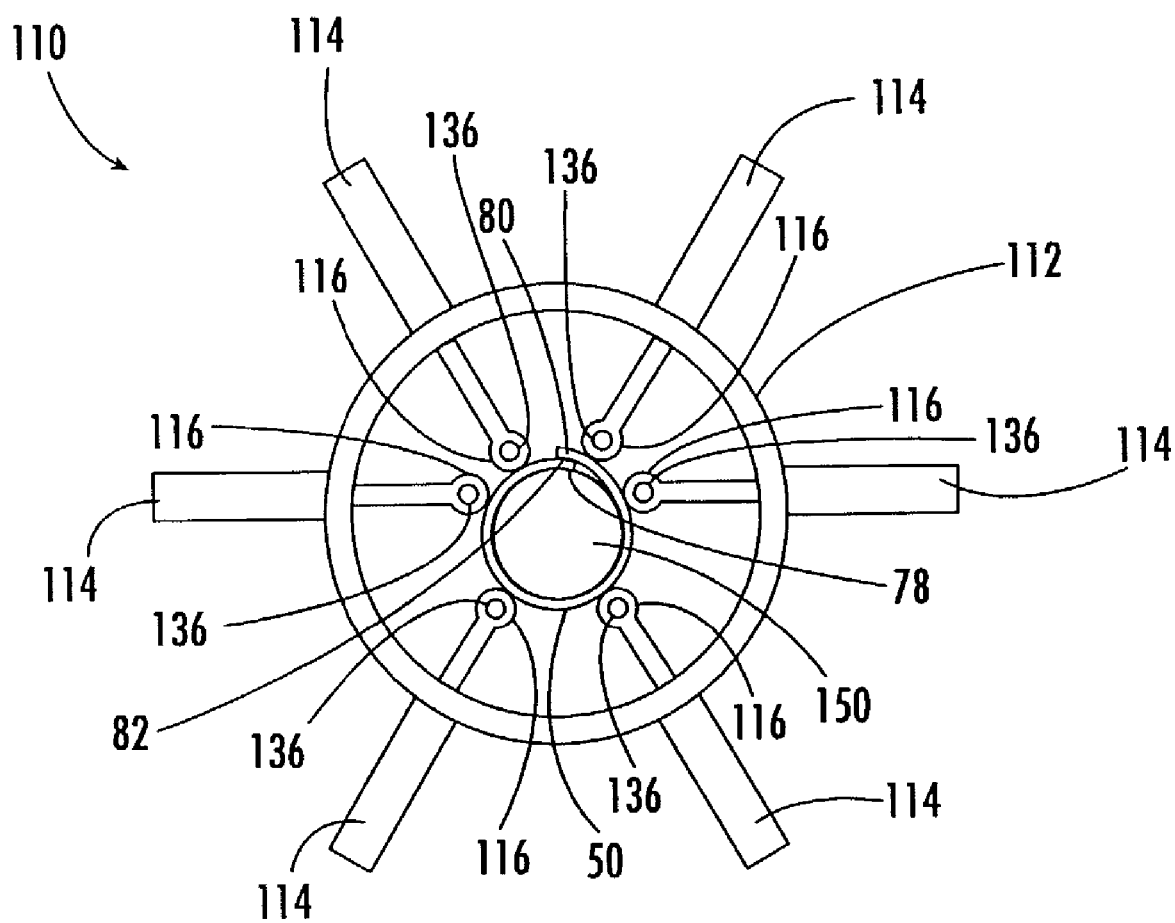
Figure 12:
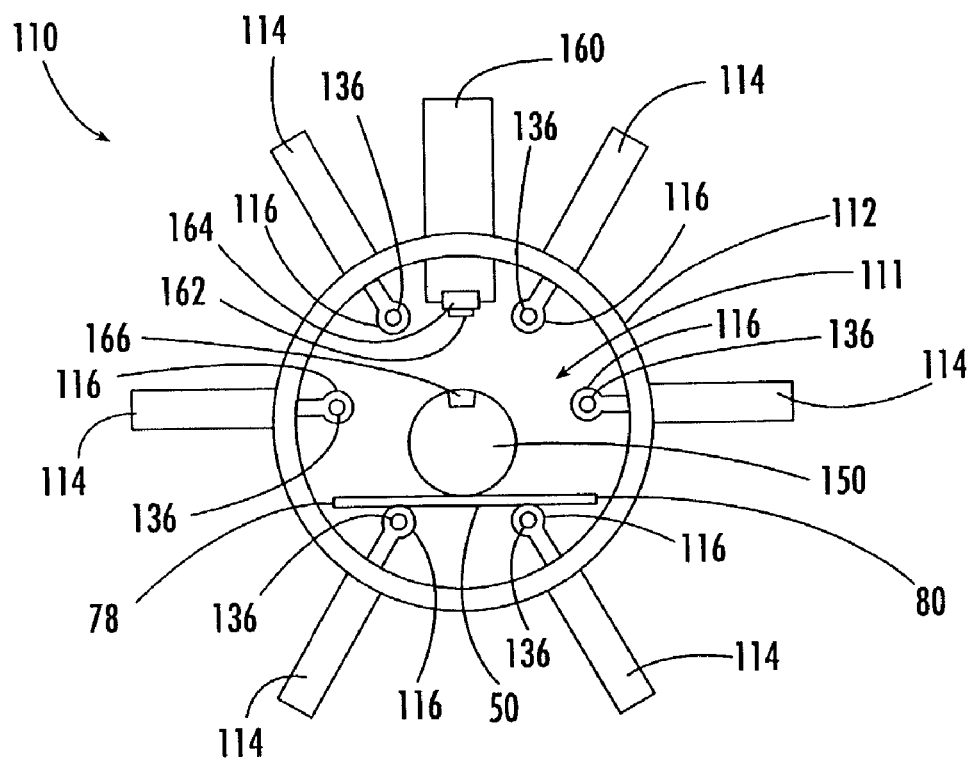
Figure 13:
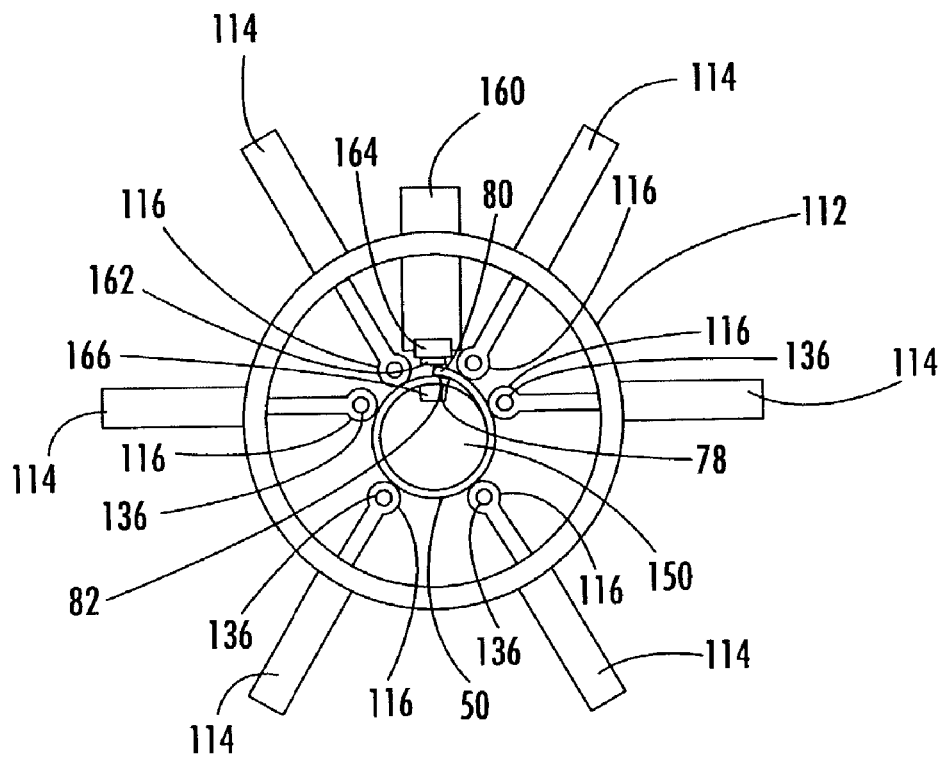
Figure 14:
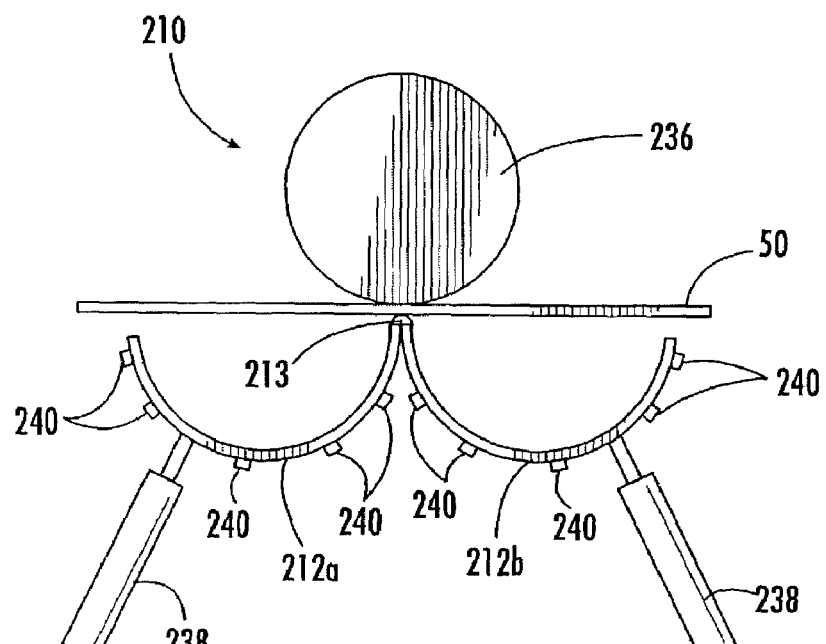
Figure 15:
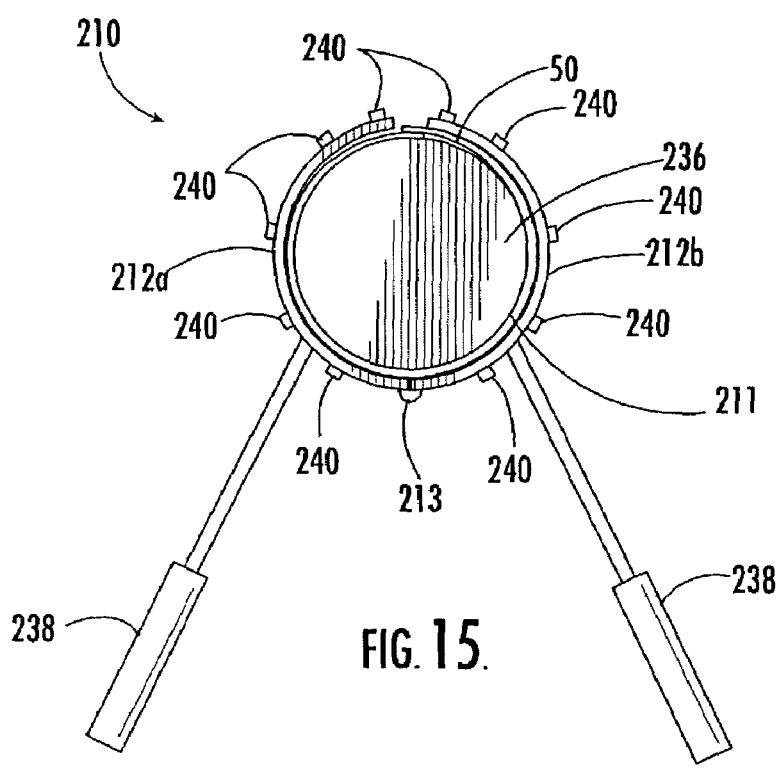
Figure 16:
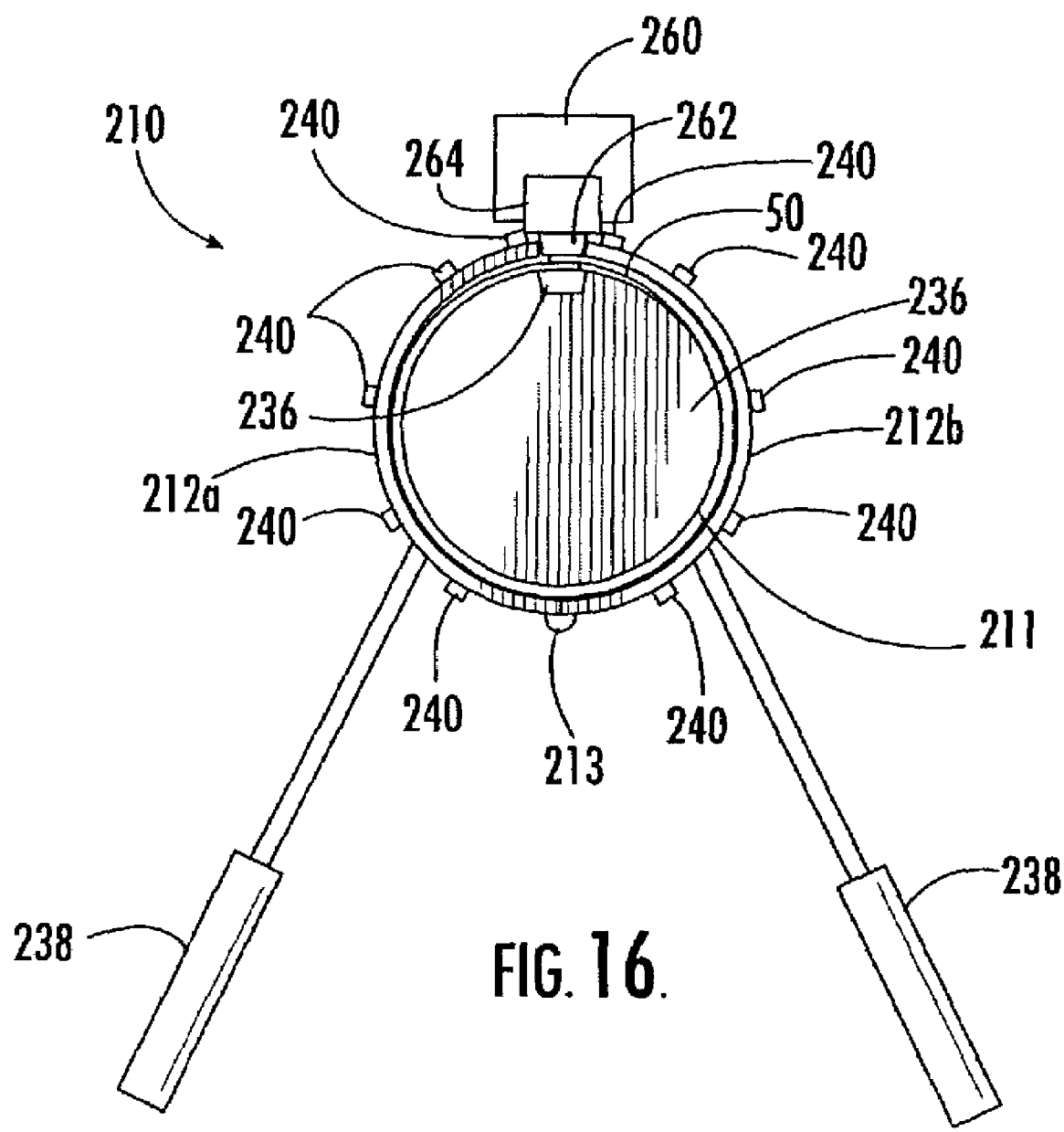
Figure 17:
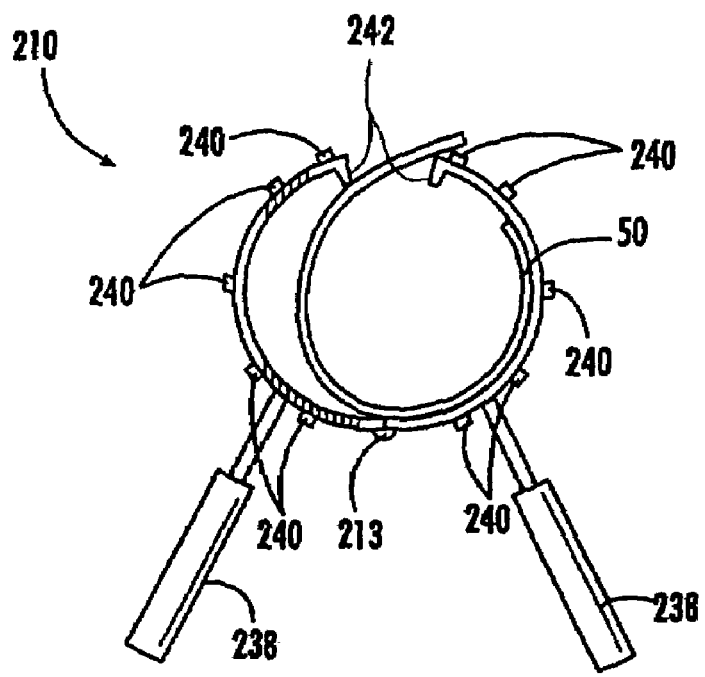
Figure 18:
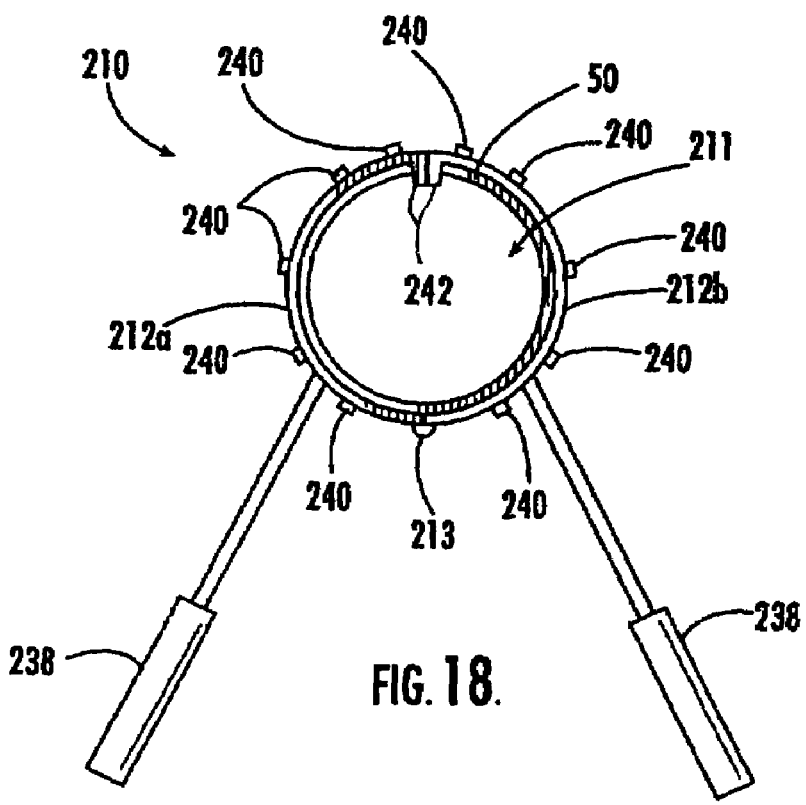
Figure 19:
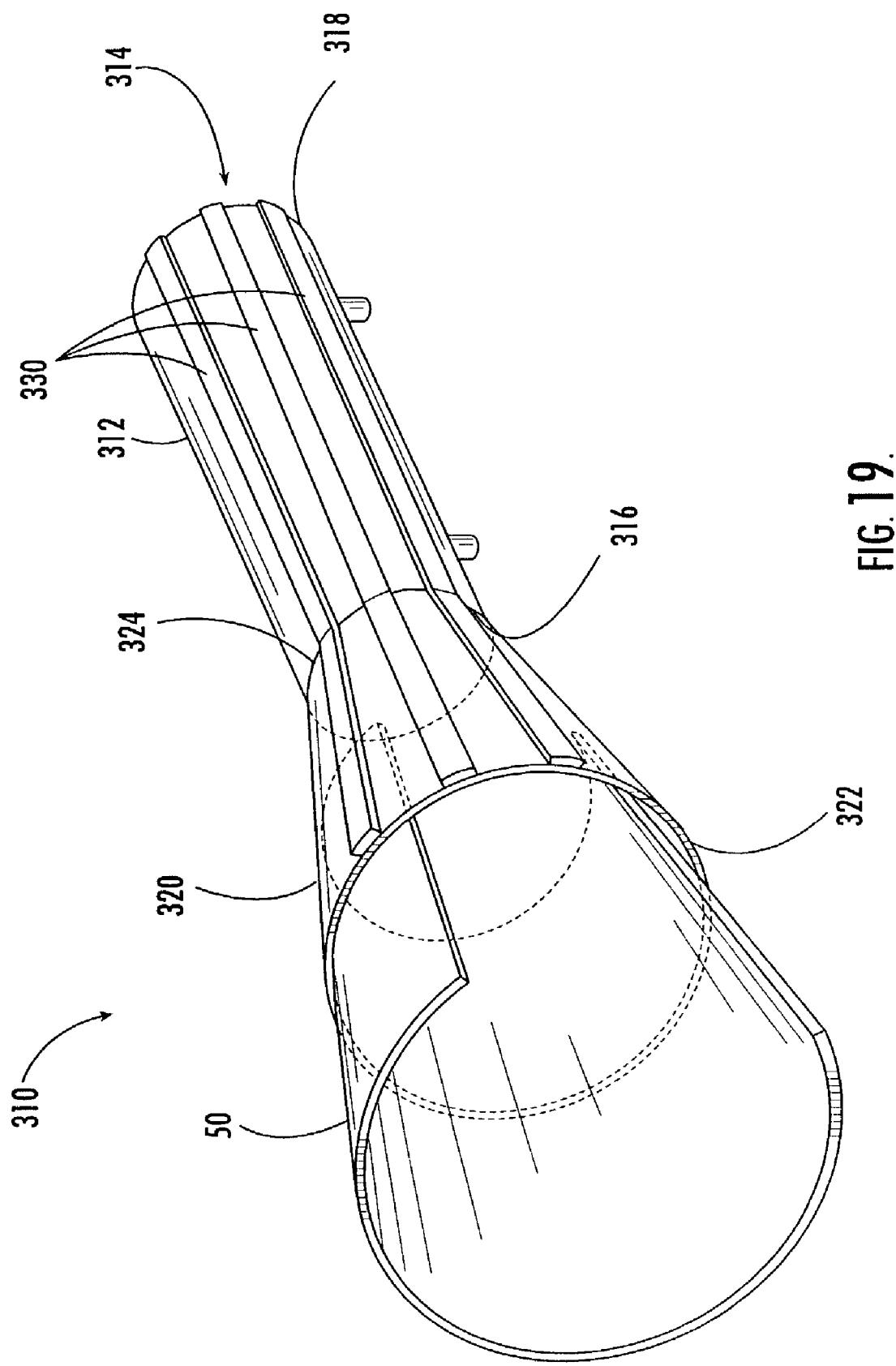

Having thus described the invention in general terms, reference will now be made to the accompanying drawings, which are not necessarily drawn to scale, and wherein:

FIG. 1 is a perspective view of a preforming apparatus according to one embodiment of the present invention;

FIG. 2 is a perspective view of flat thermoplastic sheet for forming a preform according to one embodiment of the present invention;

FIG. 3 is a perspective view of a preform formed from the sheet of FIG. 2 according to one embodiment of the present invention;

FIG. 4 is a perspective view of a duct formed from the preform of FIG. 3 according to one embodiment of the present invention;

FIG. 5 is a perspective view of a preforming apparatus according to one embodiment of the present invention;

FIG. 6 is an elevation view of a preforming apparatus according to another embodiment of the present invention;

FIG. 7 is an elevation view of a preforming apparatus according to another embodiment of the present invention in an open configuration;

FIG. 8 is an elevation view of the preforming apparatus of FIG. 7 in a closed configuration;

FIG. 9 is a section view of the preforming apparatus of FIG. 8 as seen along line 9—9 of FIG. 8;

FIG. 10 is a section view of the preforming apparatus of FIG. 9 with the sheet partially preformed;

FIG. 11 is a section view of the preforming apparatus of FIG. 9 with the sheet fully preformed;

FIG. 12 is a section view of the preforming apparatus of FIG. 9 including a consolidation joining head adjusted to an open position according to one embodiment of the present invention;

FIG. 13 is a section view of the preforming apparatus of FIG. 12 with the consolidation joining head adjusted to a closed position;

FIG. 14 is an elevation view of a preforming apparatus according to another embodiment of the present invention in an open position;

FIG. 15 is an elevation view of the preforming apparatus of FIG. 14 in a closed position;

FIG. 16 is an elevation view of the preforming apparatus of FIG. 14 including a consolidation joining head according to one embodiment of the present invention;

FIG. 17 is an elevation view of a preforming apparatus according to another embodiment of the present invention in an open position with the thermoplastic sheet partially inserted;

FIG. 18 is an elevation view of the preforming apparatus of FIG. 17 in a closed position; and FIG. 19 is a perspective view of a preforming apparatus according to another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, there is shown a preforming apparatus 10 for preforming a thermoplastic member, such as a thermoplastic sheet 50 as shown in FIG. 2. Preforming generally refers to bending the thermoplastic member to form a bent or curved preform 70 as shown in FIG. 3, which, in an unrestrained condition, generally corresponds to a desired configuration of a duct 90. The preform 70 can be formed to have a diameter slightly larger or smaller than the desired diameter of the duct 90, for example, so that the preform 70 can be subjected to a compressive or expansion force for holding the preform 70 during subsequent processing, such as consolidation joining, to arrive at the desired configuration of the duct 90. The preform 70 and, hence, the duct 90, shown in FIG. 4, extend from a first end 72 to a second end 74 and define a passage 76. Preferably, longitudinal edges 78, 80 of the preform 70 are overlapped to form an interface portion 82. The longitudinal edges 78, 80 of the preform 70 can be joined to form the duct 90 having a seam or joint 92, preferably without significantly further bending or deforming the preform 70 so that the duct 90 is substantially free of internal stress. The longitudinal edges 78, 80 can be joined using adhesives, heat, or other joining methods. For example, joining can be achieved by applying heat and pressure to the edges 78, 80 to form the seam 92. As the thermoplastic material of the preform 70 is heated above its glass transition temperature, the material becomes plastic and the pressure consolidates and joins the interface 82. Joining can be performed by manual or automated methods, for example, as described in U.S. application Ser. No. [. . . ], titled "Consolidation Joining of Thermoplastic Laminate Ducts."

The shape of the preform 70 is determined by projecting the desired shape of the duct 90 onto the flat sheet 50. Although the ends 72, 74 and edges 78, 80 of the preform 70 are shown to be straight in FIG. 3, the preform 70 can alternatively define a variety of shapes that correspond to ducts that are straight, curved, tapered, or otherwise contoured. The sheet 50 and, hence, the preform 70 and duct 90 can also define a variety features such as holes 75, for example, for connecting spuds, brackets, and the like to the duct 90. Methods and apparatuses for forming preforms and for determining geometric patterns that correspond to ducts are provided in U.S. application Ser. No. [. . . ], titled "Thermoplastic Laminate Duct." It is also appreciated that marks can be provided on the preform 70, for example, to accurately identify the location of post-formed features such as bead and bells or to facilitate the manufacture or assembly of the ducts, as also provided in U.S. application No. [. . . ], titled "Thermoplastic Laminate Duct."

Preferably, the preform 70 is formed of a composite laminate that includes a thermoplastic matrix and a reinforcing material. Thermoplastic materials are characterized by a transition to a plastic state when heated above a glass transition temperature. For example, the preform 70 can be formed of polyetherimide (PEI) or polyphenol sulfide (PPS), both of which can be thermoplastic. Thermoplastic PEI is available under the trade name Ultem®, a registered trademark of General Electric Company. According to one embodiment of the present invention, each preform 70 is formed of a composite material that includes a matrix of thermoplastic PEI that is reinforced with a reinforcing material such as carbon, glass, or an aramid fabric such as a Kevlar® aramid, or fibers of such a material. Alternatively, the preform 70 can be formed of other thermoplastic materials, which can be reinforced by other reinforcing materials, or can include no reinforcing materials.

The duct 90 formed from the preform 70 can be used in numerous applications including, but not limited to, environmental control systems of aerospace vehicles, in which air is delivered through the passage 76 of the duct 90 to provide heating, cooling, ventilation, and/or pressurization of an aircraft cabin. The ends 72, 74 of the duct 90 can be connected to other ducts or other devices such as ventilators, compressors, filters, and the like. Multiple ducts 90 can be connected so that a longitudinal axis of each duct 90 is configured at an angle relative to the longitudinal axis of the adjoining duct(s). Thus, the ducts 90 can be connected to form an intricate duct system (not shown) that includes numerous angled or curved ducts 90 for accommodating the devices connected by the duct system and for meeting layout restrictions as required, for example, on an aircraft where space is limited.

The preforming apparatus 10 shown in FIG. 1 includes a first roller 12 and a second roller 14. The rollers 12, 14 extend longitudinally and are supported by a frame (not shown) such that the rollers 12, 14 are substantially parallel and define a nip. The rollers 12, 14 can be formed of a variety of materials such as aluminum, steel, and alloys thereof, and a non-stick layer can be disposed on the rollers 12, 14 to prevent the sheet 50 from sticking to the rollers 12, 14. For example, the non-stick layer can be formed of Teflon® film, registered trademark of E. I. du Pont de Nemours and Company. An actuator 20, such as an electric motor, is configured to rotate at least one of the rollers 12, 14. In the embodiment of FIG. 1, the actuator 20 is configured to rotate the first roller 12 such that, as the sheet 50 is fed into the nip in a direction 13, the rotating roller 12 transports the sheet 50 through the nip.

The first roller 12 includes a heater 30, which is configured to heat the roller 12 and, thus, the thermoplastic sheet 50 to at least a processing temperature. As the foregoing examples illustrate, the first roller 12 is therefore formed of a thermally conductive material. Preferably, the sheet 50 is heated to a processing temperature that is less than the glass transition temperature of the thermoplastic material of the sheet 50. For example, the processing temperature can be between about 5° F. and 70° F. less than the glass transition temperature. In the case of PEI, which has a glass transition temperature of about 417° F., the sheet 50 can be heated to a processing temperature of between about 350° F. and 412° F.

As the sheet 50 is transported through the nip, the rollers 12, 14 exert a compressive force on the sheet 50 and heat the sheet 50. One or both of the rollers 12, 14 can be adjusted toward or away from the opposite roller 12, 14 to adjust the compressive force on the sheet 50. Preferably, the sheet 50 is heated disproportionately by the rollers 12, 14 so that the sheet 50 is bent or formed as the sheet 50 emerges from the nip, for example, due to thermal expansion or contraction of the reinforcing material in the sheet 50. For example, the heater 30 in the first roller 12 can be used to heat the sheet 50 so that the reinforcing material that is closer to the first roller 12 as the sheet 50 passes through the nip is expanded or contracted and the sheet 50 is bent. If the reinforcing material is one that expands when heated, such as carbon or glass reinforcement materials, the sheet 50 is bent around the second roller 14. If the reinforcing material is one that contracts when heated, such as an aramid reinforcement material, the sheet 50 is bent around the first roller 12. Thus, the longitudinal edges 78, 80 of the sheet 50 are bent together to form the preform 70, which generally corresponds to the desired shape of the duct 90.

As shown in FIG. 5, a preforming apparatus 10a according to the present invention can also include multiple rollers 14a–14f that are spaced at incremental angular positions about the first roller 12 so that each of the rollers 14a–14f defines a nip with the first roller 12. The first longitudinal edge 78 of the sheet 50 is fastened to the first roller 12 by a fastener 16, which is a strip of heat resistant adhesive tape. Other fasteners 16 can also be used, such as glue, screws, bolts, clips, hooks, and the like. The first longitudinal edge 78 precedes the rest of the sheet 50, i.e., the first edge 78 is the "leading edge." The fastener 16 retains the first edge 78 against the roller 12 and the sheet 50 is thus transported through the nips defined by the rollers 14a–14f and the first roller 12. Although the first longitudinal edge 78 is connected to the first roller 12 in FIG. 5, the second edge 80 can also, or alternatively, be connected to the roller 12. Additionally, the rollers 14a–14f can be adjustable radially relative to the first roller 12 to urge the sheet 50 against the roller 12. For example, the rollers 14a–14f can be adjusted radially outward from the roller 12 during processing to receive the leading longitudinal edge 68, 80 of the sheet 50 and then adjusted radially inward toward the roller 12 to urge the sheet 50 against the roller 12.

As shown in FIG. 6, a preforming apparatus 10b according to another embodiment of the invention includes a deflection roller 40 for deflecting and bending the sheet 50 as the sheet emerges from the nip between the first and second rollers 12, 14. The deflection roller 40 is positioned to intersect a tangent of the nip between the first and second rollers 12, 14. Thus, the tangent of the nip, i.e., a line tangent to both of the first and second rollers 12, 14 at the nip therebetween, intersects the deflection roller 40. Similarly, as the sheet 50 emerges from the nip and follows a course approximating a direction of the tangent of the nip, the sheet 50 contacts the deflection roller 40 and is thereby bent. Preferably, the deflection roller 40 is offset from the tangent of the nip, i.e., the tangent of the nip intersects a portion of the deflection roller 40 other than a rotational axis of the deflection roller 40. Advantageously, the deflection roller 40 can be offset such that the axis of the deflection roller 40 is closer to the second roller 14 than the first roller 12 and the sheet 50 is thus deflected to bend about the first roller 12.

The deflection roller 40 is rotatably mounted to a pivot 42 and a deflection actuator 44 is configured to adjust the position of the deflection roller 40 and change the degree of bending of the sheet 50. Adjustment of the deflection roller 40 can be desirable to change the bend of the sheet 50, or to maintain a uniform bend despite changes in other system parameters such as temperature of the sheet 50, thickness of the sheet 50, material type of the sheet 50, and the like. Additionally, a nip actuator 46 is configured to adjust the second roller 14 relative to the first roller 12 and thereby affect the compressive force exerted by the rollers 12, 14 on the sheet 50 as the sheet 50 is transported through the nip, for example, to adjust for different thicknesses of the sheet 50. The nip actuator 46 can be a hydraulic, pneumatic, electric, or other type of actuation device.

The sheet 50 can be supported by a support table 34 and heated by heaters 32 as the sheet 50 is fed into the nip. Cam rollers 48 are positioned at incrementally longitudinal locations to support the rollers 14, 40. By supporting the rollers 14, 40 at longitudinal locations between the ends of the rollers 14, 40, the cam rollers 48 decrease the longitudinal deflection of the rollers 14, 40. A guard 49 is also provided to catch the sheet 50 and prevent the sheet 50 from continuously passing through the nip multiple times. Alternatively, the sheet 50 can be transported multiple times through the nip(s) of the forming apparatuses 10, 10a, 10b. For example, the first roller 12 of the preforming apparatus 10a shown in FIG. 5 can be rotated more than one revolution after the first longitudinal edge 78 has entered the first nip between the rollers 12, 14a. Thus, the roller 12 and the sheet 50 can be rotated until the sheet 50 has been bent to the configuration of the preform 70.

Additionally, one or more of the rollers 12, 14, 14a–14f can be magnetized so that the rollers 12, 14, 14a–14f are magnetically attracted and the nip therebetween is uniform along the length of the rollers 12, 14, 14a–14f. The rollers 12, 14, 14a–14f can include a magnetized material, such as a ferrous metal, or an electromagnet for generating the attraction between the rollers. For example, the first roller 12 can include an electromagnet and the second roller 14 can be formed of steel so that the second roller 14 is attracted toward the first roller 12 and the nip between the rollers 12, 14 is uniform along the length of the rollers 12, 14.

There is shown in FIGS. 7–11 a preforming apparatus 110 that includes an outer support structure comprising ring supports 112, each arranged about a common longitudinal axis. The ring supports 112 support actuators 114, which are configured to support a plurality of parallel rods 116, six in the illustrated embodiment, and adjust the rods 116 radially inward and outward. As shown in FIGS. 9–11, the rods 116 can be adjusted radially to define an adjustable cavity 111 therein and, thus, support and bend, or preform, the sheet 50 to the desired configuration of ducts of different diameters and/or shapes, thus forming the preform 70.

Each of the rods 116 can be heated during processing, for example, by heaters 136 disposed in the rods 116, such that the rods heat the sheet 50. Alternatively, the sheet 50 can be heated by a heater (not shown) in the beam 150 or a heater configured to irradiate the sheet 50. For example, the preforming apparatus 110 can be positioned in an oven, or a directional radiation source, such as an infrared or a microwave source, can be configured to heat the sheet 50. Preferably, the heater(s) are configured to heat the sheet 50 to a processing temperature that is less than the glass transition temperature of the thermoplastic material of the sheet 50, for example, between about 5° F. and 70° F. less than the glass transition temperature.

An inner beam 150, which extends from a first end 170 to a second end 172, is positioned in the cavity 111 defined by the rods 116 such that the sheet 50 can be positioned around the inner beam 150. Although the ends 170, 172 of the inner beam 150 are supported by a base 113, at least one of the ends 170, 172 of the inner beam 150 can be disconnected from the base 113 to facilitate the insertion of the sheet 50 into the cavity 111 of the preforming apparatus 110. For example, a latch 168 can be adjusted between an open position and a closed position. With the latch 168 in the open position, shown in FIG. 7, the sheet 50 can be inserted longitudinally into the preforming apparatus 110 such that the sheet 50 is disposed around the inner beam 150.

The preforming apparatus 110 can be used to form the preform 70 of FIG. 3 from the sheet 50 of FIG. 2. During operation, the axial actuators 114 are used to retract the rods 116 radially outward to a first position, as shown in FIG. 9, and the latch 168 is opened. The sheet 50 is longitudinally installed in the preforming apparatus 110 so that the sheet 50 is supported by at least one of the rods 116. The latch 168 is then closed to secure the first end 170 of the inner beam 150 to the outer support structure or the base 113, as shown in FIG. 8.

With the preforming apparatus 110 assembled as shown in FIG. 8, a power supply (not shown) is connected to the heaters 136 in the rods 116 or other heaters for heating the sheet 50, preferably to the processing temperature. The actuators 114 are actuated to extend the rods 116 radially inward so that the rods 116 urge the sheet 50 against the inner beam 150 and bend the sheet 50 about the inner beam 150 to the desired configuration of the duct 90, thus forming the preform 70. Preferably, the longitudinal edges 78, 80 are overlapped to form the interface 82. After the preform 70 is formed, the heater 136 can be turned off so that the preform 70 is cooled to a temperature below the processing temperature before the latch 168 is opened and the preform 70 is removed from the preforming apparatus 110.

As shown in FIGS. 12 and 13, the preforming apparatus 110 can also include a consolidation joining head 160 that is configured to be adjusted radially relative to the inner beam 150. The head 160 can be retracted from the cavity 111 during preforming, as shown in FIG. 12, and then positioned proximate to the preform 70 and in alignment with the interface 82 of the preform 70 as the preform 70 is held in the desired configuration of the duct 90 as shown in FIG. 13. The head 160 includes a heater 162 that is supported by an elastomeric block 164, such that the heater 162 is disposed on or in the block 164. After the sheet 50 has been configured to form the preform 70, i.e., in the desired configuration of the duct 90 as shown in FIG. 13, the head 160 can be adjusted radially inward so that the block 164 and/or the heater 162 contact the preform 70. The head 160 compresses the edges 78, 80 of the preform 70 together at the interface 82. Preferably, the heater 162 is flexible, and flexibly supported by the elastomeric block 164, so that the heater 162 conforms to the preform 70 and exerts a substantially uniform pressure thereon. For example, the heater 162 can comprise a flexible silicone heater disposed on the elastomeric block 164. As the head 160 compresses the interface 82 against the inner beam 150, the heater 162 heats the interface 82 and the edges 78, 80 are thus consolidation joined to form the longitudinal seam 92, thereby forming the duct 90. The inner beam 150 can also include an inner heater 166, in addition or in alternative to the heater 162. Thus, the interface 82 can be heated by the heater 162, the inner heater 166, or both heaters 162, 166. Preferably, the heater(s) 162, 166 are configured to heat the edges 78, 80 to a temperature above the glass transition temperature of the thermoplastic material. Consolidation joining is further discussed in U.S. application Ser. No. 10/215,833, titled "Consolidation Joining of Thermoplastic Laminate Ducts."

FIGS. 14 and 15 illustrate an alternative preforming apparatus 210, in which the outer support structure includes two partial tubes 212a, 212b connected by a hinge 213. The partial tubes 212a, 212b can be rotated about the hinge 213 by actuators 238 from an open position, shown in FIG. 14, to a closed position, shown in FIG. 15. In the closed position, the partial tubes 212a, 212b define an internal cavity 211 that corresponds to the desired shape of the preform 70 and the duct 90. A rigid inner member 236 is positioned proximate to the tubes 212a, 212b so that the tubes 212a, 212b at least partially enclose the inner member 236 when adjusted to the closed position. The rigid inner member 236 can be formed of a rigid material, such as steel, aluminum, or titanium, or the inner member 236 can be formed of a device that can be configured to be rigid, such as an inflatable bladder. The inner member 236 corresponds to the shape of the partial tubes 212a, 212b and, in the illustrated embodiment, is cylindrical although the partial tubes 212a, 212b and the inner member 236 may have other shapes if desired. Thus, the sheet 50 can be positioned between the partial tubes 212a, 212b and the inner member 236, and the preforming apparatus 210 can be used to bend the sheet 50 from the flat configuration to the bent or preformed configuration by adjusting the partial tubes 212a, 212b from the open position to the closed position and urging the sheet 50 around the inner member 236. Advantageously, the partial tubes 212a, 212b and/or the inner member 236 can be heated to thereby facilitate the bending or forming of the sheet 50. For example, heaters 240 can be provided in or on each of the partial tubes 212a, 212b, which, in turn, are constructed of a material such as aluminum, steel, titanium, alloys thereof, or a composite material, that is at least partially thermally conductive. Alternatively, the partial tubes 212a, 212b and/or the inner member 236 can be heated by an independent heater, such as an oven, configured to receive the partial tubes 212a, 212b when rotated to their open positions.

The preforming apparatus 210 can also include a consolidation joining head 260 positioned proximate to the inner member 236 and in alignment with a gap between the partial tubes 212a, 212b once the partial tubes 212a, 212b have been closed. The head 260 is adapted to be adjusted radially relative to the inner member 236. The head 260 can include a heater 262 that is supported by an elastomeric block 264, such that the heater 262 is disposed on or in the block 264. After the sheet 50 has been configured to form the preform 70, i.e., in the desired configuration of the duct 90 as shown in FIG. 16, the head 260 can be adjusted radially inward so that the block 264 and/or the heater 262 contact the preform 70. Advantageously, the preform 70 may be positioned such that the edges 78, 80 of the preform 70 are also in general alignment with the gap between the partial tubes 212a, 212b once the partial tubes 212a, 212b have been closed. In this advantageous embodiment, the head 260 compresses the edges 78, 80 of the preform 70 together at the interface 82. Preferably, the heater 262 is flexible, and flexibly supported by the elastomeric block 264, so that the heater 262 conforms to the preform 70 and exerts a substantially uniform pressure thereon while concurrently heating at least one edge 78, 80 of the preform 70 to consolidation join the edges 78, 80 and form the longitudinal seam 92 along the length of the preform 70, thereby forming the duct 90. The inner member 236 can include an inner heater 266, in addition to or in alternative to the heater 262, so that the preform 70 can be heated on its inner and outer surfaces, preferably to a temperature above the glass transition temperature. The sheet 50 can be held in position about the inner member 236 by one or more straps and/or tape (not shown) instead of the partial tubes 212a, 212b. Preferably, the tape is heat shrink tape, i.e., tape that constricts in length as the tape is heated to a processing temperature. Thus, the sheet 50 is wrapped around the inner member 236, and the straps, which can be formed of heat resistant cloth, are secured around the sheet 50 to hold the sheet 50 in the desired configuration of the duct 90. The heat shrink tape is then disposed around the sheet 50 such that the tape, when heated, constricts and urges the sheet 50 tightly against the inner member 236. The thermal energy for heating the sheet 50 and the tape can be generated by an oven configured to receive the inner member 236 and the sheet 50 or by a heater located within the inner member 236.

As shown in FIGS. 17 and 18, the preforming apparatus 210 can also be used without the inner member 236. For example, each of the partial tubes 212a, 212b can define a longitudinal stop 242 that extends radially inward toward the cavity 211. With the partial tubes 212a, 212b in the open position, as shown in FIG. 17, the sheet 50 can be inserted between the stops 242 such that the stops 242 retain the sheet 50 as the partial tubes 212a, 212b are adjusted by the actuators 238 to the closed position, as shown in FIG. 18. The sheet 50 can be inserted into the cavity 211 through a gap 214 between the longitudinal stops 242, as shown in FIG. 17. The sheet 50 can also be inserted in a longitudinal direction into the cavity 211 from a longitudinal end of the tubes 212a, 212b, and the tubes 212a, 212b can be in the closed position while the sheet 50 is inserted. As described above, the sheet 50 can be heated with the heaters 240 or other heaters (not shown) to the processing temperature and, after forming, the preform 70 can be cooled in the preforming apparatus 210 before the partial tubes 212a, 212b are opened to release the preform 70. A consolidation joining head and/or an inner heater as described in connection with FIG. 16 can also be used to join the edges 78, 80 as the preform 70 is held in the configuration shown in FIG. 18.

FIG. 19 illustrates an alternative preforming apparatus 310 according to the present invention, which includes a hollow tube 312 and a funnel 320. The hollow tube 312 can define a cylindrical cavity 314 or another shape that corresponds to the desired configuration of the preform 70 and the duct 90. Additionally, the tube 312 can include an inner member (not shown) that can be received by the passage 76 of the preform 70 and defines an outer surface that corresponds to the desired configuration of the duct 90. The funnel 320 extends longitudinally from a first end 316 of the tube 312. The funnel 320 extends from a first end 322 to a second end 324, which is smaller than the first end 322 and generally corresponds in size to the first end 316 of the tube 312, so that the funnel 320 tapers toward the tube 312. The sheet 50 can be inserted into the funnel 320 in a flat or partially bent configuration and urged longitudinally toward and into the cavity 314 of the tube 312. As the sheet 50 slides longitudinally in the funnel 320, the tapering shape of the funnel 320 causes the sheet 50 to bend to the diameter of the cylinder 312 and, hence, the desired configuration of the preform 70 and the duct 90. The sheet 50 can be inserted into the funnel 320 and the tube 312 manually by an operator, or an automated insertion device (not shown) can be provided. Heaters 330 can be provided on the funnel 320 and/or the tube 312 such that the sheet 50 is heated to the processing temperature while the sheet 50 is urged into the funnel 320 and/or the tube 312. For example, the heaters 330 can be electrical resistive heaters disposed on the tube 312 and the funnel 320 such that the heaters 330 can be connected to a power supply (not shown) and energized to heat the sheet 50. The sheet 50 can be held at the processing temperature for a processing hold interval, such as 10 minutes, and the heaters 330 can then be turned off so that the resulting preform 70 is cooled in the tube 312 before being removed through the first end 316 or a second end 318. Further, the tube 312 can comprise a consolidation joining apparatus or other joining apparatus for joining the longitudinal edges 78, 80 of the preform 70 and forming the duct 90, for example, as discussed in U.S. application Ser. No. [. . . ], titled "Consolidation Joining of Thermoplastic Laminate Ducts."

After the preformed 70 has been processed to form the duct 90, the duct 90 can be post-formed to provide additional contours or features, such as bells, beads, and the like. A discussion regarding the formation of duct features such as bells and beads through post-forming, i.e., after the preforming and/or the consolidation joining of the sheet 50, is provided in U.S. application Ser. No. [. . . ], titled "Post-Forming of Thermoplastic Ducts" filed concurrently herewith and the contents of which are incorporated herein by reference. It is also appreciated that marks can be provided on the preform 70, for example, to accurately identify the location of such post-formed features or to facilitate the manufacture or assembly of the ducts, as provided in U.S. application Ser. No. [. . . ], titled "Thermoplastic Laminate Duct."

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, it is appreciated that each of the working surfaces of the apparatuses can include a low friction layer or release layer, e.g., Teflon®, registered trademark of E.I. du Pont de Nemours and Company. The release layer can be a durable layer of material or a release agent that is wiped or sprayed onto the working surfaces before each consolidation joining process. Although specific terms are employed herein, they are used in a generic and descriptive sense only and not for purposes of limitation.

What is claimed is:

1. An apparatus for preforming a thermoplastic member to form a preform generally corresponding to a desired configuration of a thermoplastic duct defining a passage, the apparatus comprising:
    a support structure comprising two partial hollow tubes, each tube rotatably adjustable between said first and second positions, the tubes extending longitudinally and at least partially defining a cavity;
    an elongate member having an outer surface corresponding to the desired configuration of the duct said elongate member extending longitudinally in the cavity defined by said support structure such that the thermoplastic member can be supported between said support structure and said elongate member; and
    a heater configured to heat the thermoplastic member to a processing temperature; and
    a consolidation joining head comprising an elastomeric block and a heater,
    wherein the tubes define an interior surface corresponding to the outer surface of said elongate member such that said support structure is configured to adjust from a first position in which said support structure is configured to support the thermoplastic member in a flat configuration to a second position in which said support structure is adjusted radially inward and thereby bends the thermoplastic member against the elongate member to the desired configuration of the duct, and wherein the consolidation joining head is configured to adjust radially against an interface formed by overlapping edges of the thermoplastic member and hear the interface of the thermoplastic member to above a glass transition temperature to thereby consolidation join the edges.

2. An apparatus for preforming a thermoplastic member to form a preform according to claim 1, wherein said heater is configured to heat the thermoplastic member to the processing temperature less than a glass transition temperature and within about 70° F. of the glass transition temperature.

3. An apparatus for preforming a thermoplastic member to form a preform according to claim 1, wherein said heater is in thermal communication with said tubes and configured to heat the interior surfaces of said tubes to the processing temperature.

4. An apparatus for preforming a thermoplastic member to form a preform according to claim 1, further comprising at least one actuator configured to adjust said support structure between the first and second positions.

5. An apparatus for preforming a thermoplastic member to form a preform generally corresponding to a desired configuration of a thermoplastic duct defining a passage, the apparatus comprising:
    two partial hollow tubes extending longitudinally and at least partially defining a longitudinal cavity, each said tube having a first longitudinal edge joined by a hinge and a second longitudinal edge defining a radially inwardly extending stop, said partial hollow tubes being configured to rotatably adjust from a first position in which said cavity is open to a second position in which said cavity is at least partially closed such that said tubes cooperably form the cavity and define an inner surface corresponding to the desired configuration of the duct; and
    a heater configured to heat the thermoplastic member,
    wherein said tubes in the first position are configured to receive and support the thermoplastic member such that the thermoplastic member is retained between said stops and said tubes are configured to adjust radially inward to the second position and thereby bend the thermoplastic member to the desired configuration of the duct.

6. An apparatus for preforming a thermoplastic member to form a preform according to claim 5, wherein said heater is in thermal communication wit said tubes and configured to heat the interior surfaces of said tubes to the processing temperature.

7. An apparatus for preforming a thermoplastic member to form a preform according to claim 5, wherein said heater is configured to heat the thermoplastic member to a processing temperature less than a glass transition temperature and within about 70° F. of the glass transition temperature.

8. An apparatus for preforming a thermoplastic member to form a preform according to claim 5, further comprising at least one actuator configured to adjust said tubes between the first and second positions.

* * * * *

UNITED STATES PATENT AND TRADEMARK OFFICE
CERTIFICATE OF CORRECTION

| | | |
|---|---|---|
| PATENT NO. | : 7,153,124 B2 | Page 1 of 1 |
| APPLICATION NO. | : 10/215815 | |
| DATED | : December 26, 2006 | |
| INVENTOR(S) | : Bergsma et al. | |

It is certified that error appears in the above-identified patent and that said Letters Patent is hereby corrected as shown below:

Column 13,

Line 54, "hear" should read --heat--.

Column 14,

Line 42, "wit" should read --with--.

Signed and Sealed this

Tenth Day of April, 2007

JON W. DUDAS
*Director of the United States Patent and Trademark Office*